United States Patent [19]

Hartmann

[11] 3,746,922

[45] July 17, 1973

[54] TV CIRCUIT FOR PRODUCTION OF PARABOLIC LINE-FREQUENCY VOLTAGE

[75] Inventor: Uwe Hartmann, Villingen, Germany

[73] Assignee: Schwarzwalder Apparate-Bau-Anstalt August Schwer Sohne GmbH, Villingen, Germany

[22] Filed: May 30, 1972

[21] Appl. No.: 257,685

[52] U.S. Cl. .................... 315/276 D

[51] Int. Cl. .................... H01j 29/70

[58] Field of Search .................... 315/27 R, 27 TD, 315/24, 27 GD

[56] References Cited

UNITED STATES PATENTS

| | | | |
|---|---|---|---|
| 3,479,554 | 11/1969 | Kramer | 315/24 |
| 2,620,456 | 12/1952 | White | 315/27 GD |
| 3,676,733 | 7/1972 | Eulenberg et al. | 315/27 GD |
| 3,463,961 | 8/1969 | Neal et al. | 315/24 |

*Primary Examiner*—Carl D. Quarforth
*Assistant Examiner*—J. M. Potenza
*Attorney*—C. Jay, Jr. et al.

[57] ABSTRACT

A television circuit for producing a parabolic line-frequency voltage, with the amplitude and phase of said voltage changing in accordance with frame frequency, employs a modulator circuit to generate a train of square-wave pulses at the line-frequency and being modulated in amplitude and phase at the frame rate. A first integrating circuit converts the squarewave pulses to a sawtooth train and a second integrating circuit converts the sawtooth train to a parabolic wavetrain modulated in amplitude and phase at the frame rate.

4 Claims, 7 Drawing Figures

TV CIRCUIT FOR PRODUCTION OF PARABOLIC LINE-FREQUENCY VOLTAGE

BACKGROUND OF THE INVENTION

The invention concerns a circuit arrangement for correcting the pin-cushion distortion of a raster reproduced on a television picture screen.

Pin-cushion distortion on a television picture screen is caused, as is well known, by the fact that the electrons must travel different distances, depending on the deflection angle, as the distance of the center of the deflection must be kept small in relation to the radius of curvature of the display surface of the picture screen for design reasons, and as the electrons of the deflected beam are subjected to the action of the homogeneous deflection field for a longer period of time than those of the undeflected beam. This applies especially to the television picture tube with a deflection angle of 110°, where the conditions are particularly critical and pin-cushion distortion is very prominent.

The correction of pin-cushion distortion in the North-South direction requires an additional, parabolic line-frequency current in the vertical deflection coils, but the generation of an exactly parabolic current is attended by difficulties.

It is an object of the invention to create a circuit for correcting the North-South pin-cushion distortions, which furnishes substantially parabolic correction voltage at the line-frequency for driving a linear amplifier with negative current feedback.

Circuits known up to now use tuned circuits for correction purposes and thereby generate correction currents of the cosine shape which, however, are parabolic only in first approximation. Such systems have the great disadvantage that waves develop at the top and bottom edges of the picture, (as the cosine correction current, has inflection points during the forward line sweep) have the effect that the pin-cushion distortion is optimally corrected only at some points, and it is either over or under corrected in the other portions of the upper and lower edge of the picture (Published Pat. application No. 1,762,718).

For the further processing as to amplitude and phase, rectangular line-frequency pulses modulated at raster frequency must first be generated, as is proposed in the above-mentioned Patent Application by means of a modulator circuit. From these square pulses, however, is then obtained a cosine signal which is fed into the vertical deflection coils as the correction current. Feeding in such a correction signal has the disadvantage described above.

The circuit arrangements known up to the present are either very expensive, inasmuch as two magnetic amplifiers (transductors) are used for instance, for the separate correction of the upper and lower portions of the picture, or they are not optimal (U.S. Pat. Nos. 3,329,859; 3,408,535).

In sets for receiving several television standards with different line-frequencies, the amplitude as well as the frequency must be switched in the known circuit arrangements having modulators with tuned circuits. In the modulator circuit according to the Application, however, frequency switching becomes unnecessary as the integrating circuit used functions independently of the frequency. Only the amplitude must be readjusted because the impedance jwL of the deflection coils changes.

The correction of pin-cushion distortion in the North-South direction requires an additional, parabolic line-frequency current in the vertical deflection coils. This correction current must be large at the beginning of the vertical deflection period and must decrease toward the middle of the picture, to increase again to the initial value toward the end of the picture deflection period, but with the opposite phase. For generating such a current waveform a square pulse of line-frequency, the amplitude and phase of which are modulated at the raster frequency, is required. It is known to combine a sawtooth signal taken from the vertical deflection circuit and two rectangular signals taken with opposite phase from the line transformer, so that a rectangular line-frequency voltage, modulated at the raster frequency, is generated (Published Pat. application No. 1,762,718). This circuit arrangement has the drawback that two rectangular line-frequency voltages of opposite phase and equal amplitude are required for the correction. The generation of symmetrical, rectangular line-frequency voltages, however, is obtained by difficulties in practice.

A further object of the invention is to provide a modulator circuit for generating rectangular line-frequency pulses modulated as to amplitude and phase at the raster frequency while no longer requiring symmetrical rectangular voltages. The circuit arrangement according to the invention has the great advantage over the known circuit arrangement in that it requires as input signals, in addition to the sawtooth voltage at raster frequency, only one additional rectangular line-frequency voltage. In the circuits which have been customary up to now use two rectangular line-frequency voltages of equal magnitude and opposite polarity, the trouble occurred frequently that there was a spread in the amplitude as well as in the waveshape of the rectangular voltages, so that residual error voltages remained in the output signal. As the modulator circuit according to the application requires only one line-frequency control signal, it does not depend on the high symmetry of two control voltages, so that an interference-free output signal is obtained.

BRIEF SUMMARY OF THE INVENTION

A circuit according to the invention for the correction of pin-cushion distortion in a television receiver which includes first and second signal sources said circuit comprising:

modulator means operative to generate a train of squarewave pulses the frequency of which corresponds to the frequency of signals from the first signal source said pulse train being modulated in amplitude and phase at a rate associated with the second signal source;

first integrator means coupled to said modulator means and being operative in response to said pulse train to generate a sawtooth voltage signal having a frequency corresponding to that of said pulse train and maintaining the amplitude and phase modulation at the rate associated with the second signal source;

split load circuit means coupled to said first integrator means and being operative in response to said sawtooth voltage signal to produce two sawtooth voltage signals of opposite phase; and second integrator means coupled to said split load circuit means and being operative in response to one of said sawtooth voltage signals from said split load circuit means to generate at its output connection a train of parabolic voltage signals the amplitude and phase of which are a function of the signal from said second signal source.

More specifically the generation of the parabolic correction voltage required for optimum pin-cushion correction in the North-South direction for driving a linear amplifier is achieved by connecting in series a. a modulator, known per se, for rectangular line-frequency pulses which are adjustable as to amplitude and phase and are modulated at the raster frequency;

b. a first Miller integrator for generating a line-frequency sawtooth voltage which is modulated as to amplitude and phase at the raster frequency;

c. a first impedance transformation stage in conjunction with a phase inversion stage;

d. a second Miller integrator for transforming a sawtooth voltage modulated at raster frequency, which is fed to it, into a parabolic line-frequency voltage which is modulated as to amplitude and phase at the raster frequency;

e. a second impedance transformation stage for matching to the linear amplifier.

In a further advantageous development of the invention, the modulator generating rectangular line-frequency pulses (which are modulated as to amplitude and phase at the raster frequency and from which the correction currents are obtained) is characterized by the feature that only one rectangular line-frequency voltage is used. In the first half of the picture period the rectangular voltage is combined with the raster frequency saw-tooth signal via a first diode and is connected, via a second diode and the base emitter path of a transistor, to a potential. The raster frequency sawtooth voltage is connected during the second half of the picture period, via a third diode in the collector circuit of the transistor, keyed on by the rectangular line-frequency pulses, to the adjusted emitter potential.

BRIEF DESCRIPTION OF THE DRAWINGS

In the following, the invention will be explained more fully with the aid of an example of an embodiment by means of FIGS. 1 to 5.

DETAILED DESCRIPTION OF THE INVENTION

Figure 1:
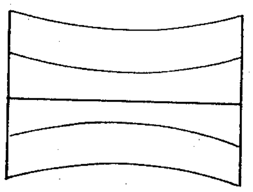
FIG. 1 shows the faulty raster on the television picture screen, which is to be corrected.

FIG. 1 shows a raster which is reproduced with the distortion in the North-South direction, to be corrected, on the screen of the television picture tube. It is assumed that the correction in the West-East direction has already been accomplished, so that the raster is bounded by two vertical lines.

Figure 2:
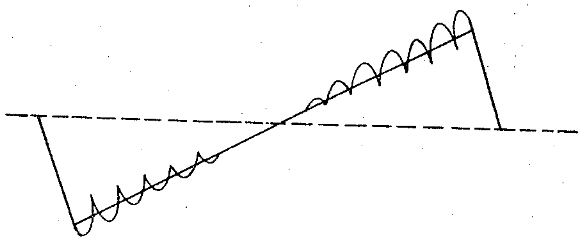
FIG. 2 shows the correction current required to eliminate the North-South pin-cushion distortion according to FIG. 1.

In order to eliminate the distortion in the North-South direction, a parabolic line-frequency current is required which is superimposed to the vertical deflection current. This additional parabolic current must change as to amplitude and phase at the raster frequency, as is shown in FIG. 2.

Figure 3:
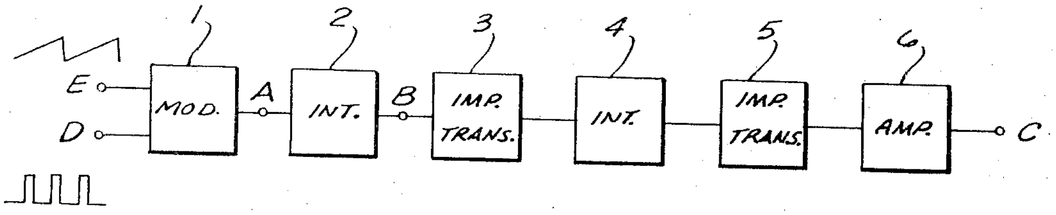
FIG. 3 shows a block diagram of the invention.

First, the individual stages of the circuit arrangement according to the invention will be described with the aid of the block diagram according to FIG. 3.

To a modulator 1 are fed at E sawtooth signals of raster frequency and at D, rectangular signals of line-frequency, which are converted in the modulator into a rectangular signal which is modulated as to amplitude and phase at the raster frequency. This signal is shown as waveform A in FIG. 5. This signal now passes through a first Miller integrator 2, whereby a line-frequency sawtooth signal which is modulated as to amplitude and phase at the raster frequency, is produced at B, and shown in waveform B of FIG. 5.

A first impedance transformer stage 3 with a phase inversion stage (split load) couples the sawtooth signal of the integrator 2 to a second Miller integrator 4 which generates from the sawtooth signal a parabolic voltage which is also modulated as to amplitude and phase at the raster frequency. The parabolic voltage is directed, via a second impedance transformer stage 5, to a linear amplifier 6 employing negative current feedback thereby furnishing the parabolic current required for the correction. It is advisable to design the Miller integrators to have strong negative current feedback for the signal components at raster frequency and to pair the input signal components at line-frequency via high-pass filters.

In a further development of the invention, there can be directed from the first impedance transformer and phase inverter stage a positive or negative signal to the output of the second impedance transformer stage for the additional correction of the well known keystone distortion of the raster.

Figure 4:
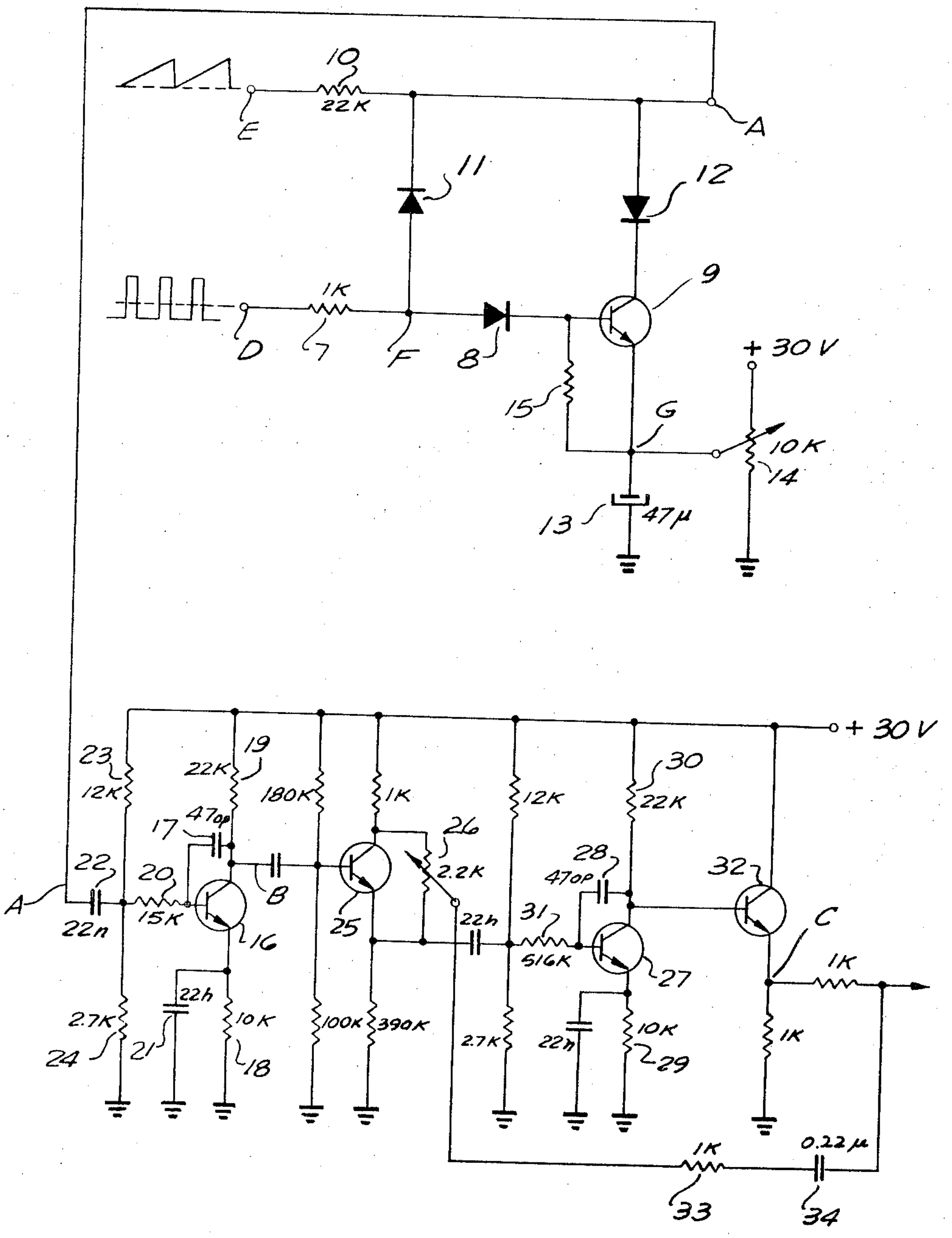
FIG. 4 shows a detailed example of a circuit diagram of the invention.

Referring to FIG. 4, the circuit arrangement according to the invention will be explained. For generating the parabolic correction currents, rectangular pulses of line-frequency which are modulated as to amplitude and phase at the raster frequency, must first be generated. A rectangular line-frequency signal is applied from a source (not shown) at D via a resistor 7 and a diode 8 to the base of a transistor 9 so that during line flyback this transistor is put in the conducting state. At the same time a sawtooth signal of raster frequency is applied at E, and is combined via the resistor 10 and a diode 11 with the rectangular signal which is fed in via the resistor 7. The raster frequency sawtooth signal is furthermore connected via a diode 12 to the collector of the transistor 9. The emitter of the transistor 9 is connected to ground via a capacitor 13 and can be adjusted to any desired potential via a potentiometer 14.

The rectangular signal which is taken off at the point A and is modulated as to amplitude and phase at raster frequency, is produced in the following manner: The rectangular line-frequency signals which are applied at D switch the point F during line flyback to the respective potential adjusted at the point G, plus the base-emitter voltage $U_{BE}$ and the forward-conduction voltage of the diode 8. During the first half of the field period and the horizontal flyback, the diode 11 conducts so that the raster frequency signal is clamped to the potential $U_F$. During the second half of the picture period the diode 11 is cut off. However, as the transistor 9 conducts during the line flyback the raster frequency sawtooth signal is clamped via the diode 12 to the emitter potential $U_G$ plus the residual collector-emitter voltage $U_{CE}$ and the forward-conduction voltage of the diode 12, so that the desired signal appears at the output A. The potential at the point G is now adjusted so that the phase change of the output signal occurs with the raster frequency at the center of the picture.

A resistor 15, connected between the base and the emitter of the transistor 15, must have a resistance so low that the switching times of the transistor 9, caused by the depletion time of the base zone, do not become appreciably longer.

Figure 5:
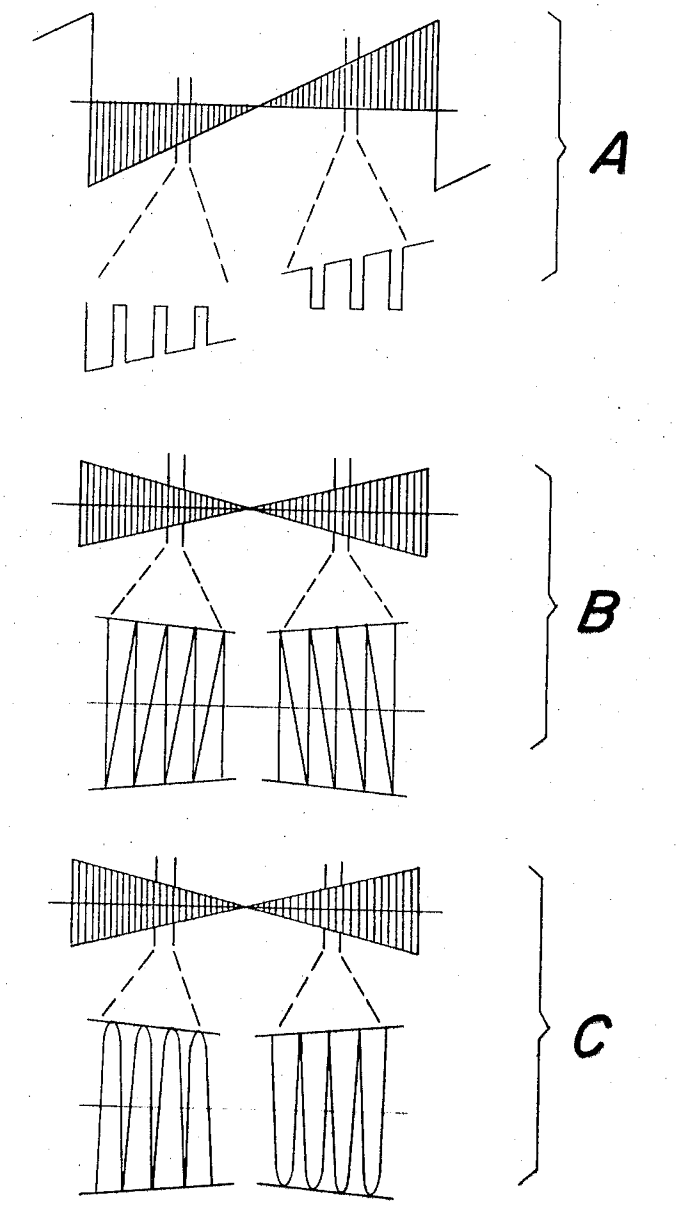
FIGS. 5a, 5b and 5c show signal wave shapes at the points indicated in FIG. 4.

The voltage taken off at point A according to the waveform A of FIG. 5 is fed to the first Miller integrator, which includes the transistor 16, the capacitor 17 and the resistors 18, 19, 20. This Miller integrator is designed so that only the rectangular pulses of horizontal line-frequency according to waveform A of FIG. 5 are integrated, as the R-C member 18, 21 in the emitter lead of the transistor 16 generate a strong negative feedback for the signal components of raster frequency. In addition, provision is made by the high-pass filter which includes the capacitor 22 and the resistors 23, 24 for attenuating the components of raster frequency. At the output B of the Miller integrator appears a voltage having the wave shape B according to FIG. 5. This voltage is subsequently fed to a stage 25 known under the name "split load circuit" which generates from a single signal two signals of opposite phase. The magnitude and phase of the signal can be adjusted by means of the control 26.

Stage 25 also serves as an impedance transformer for driving the following stage, i.e., the second Miller integrator, which includes the transistor 27, the capacitor 28 and the resistors 29, 30, 31. This Miller integrator generates from its input voltage (waveform B of FIG. 5) a voltage waveform according to the waveform C of FIG. 5. The output signal Is a parabolic line-frequency voltage the magnitude and phase of which depends on a sawtooth voltage of raster frequency. A succeeding second impedance transforming stage 32 provides an optimum matching to the succeeding linear amplifier (not shown) with strong negative current feedback, which produces from the parabolic control voltage (waveform C of FIG. 5) at C a correspondingly shaped correction current for the vertical deflection coils.

Especially in conjunction with the 110° narrow-neck tube, the vertical output stage can be utilized as the linear amplifier for the voltage generated by means of the circuit arrangement according to FIG. 4. Due to the low jaw L of the vertical deflection coils the correction votage can be small, so that the low voltage transformer can be kept small.

For the purpose of additionally correcting keystone distortion, a signal taken off at the variable resistor 26 may be fed to the output via the decoupling resistor 33 and the capacitor 34.

What is claimed is:

1. A circuit for the correction of pin-cushion distortion in a television receiver which includes a first signal source operative to generate a series of single phase pulses and a second signal source:

modulator means operative to combine the series of single phase pulses from the first source with the signals from the second source to generate a train of substantially squarewave pulses the frequency of which corresponds to the frequency of the signals from the first signal source and the amplitude and the phase of which are determined by the signal from the second signal source;

first integrator means coupled to said modulator means and being operative in response to said pulse train to generate a sawtooth voltage signal having a frequency corresponding to that of said pulse train and maintaining the amplitude and phase modulation at the rate associated with the second signal source;

split load circuit means coupled to said first integrator means and being operative in response to said sawtooth voltage signal to produce two sawtooth voltage signals of opposite phase; and second integrator means coupled to said split load circuit means and being operative in response to one of said sawtooth voltage signals from said split load circuit means to generate at its output connection a train of parabolic voltage signals the amplitude and phase of which are a function of the signal from said second signal source.

2. A circuit according to claim 1 further including means, coupled between said split load circuit means and the output connection of second integrator means, for phase adding the other of said two sawtooth voltage signals from said split load circuit means with the output signal from said second integrator means to thereby reduce keystone errors in the television receiver.

3. A circuit according to claim 1 wherein said first integrator means includes a filter circuit operative to substantially reduce the signal associated with the second signal source.

4. A circuit according to claim 1 wherein said modulator means includes first diode means having one electrode coupled to said first signal source;

second diode means having one electrode coupled to said second signal source;

third diode means having one electrode coupled to the common juncture of the first diode means and the first signal source and a second electrode coupled to the common juncture of said second diode means and said second signal source;

capacitor means having one end coupled to a source of reference potential and being operative to store a predetermined voltage.

transistor means having one electrode coupled to the second electrode of said first diode means, a second electrode coupled to the second electrode of said second diode means and a third electrode coupled to the other end of said capacitor said transistor being operative to clamp an output signal at its emitter during a predetermined time of the signal from its second signal source.

* * * * *